United States Patent Office 3,441,847
Patented Apr. 29, 1969

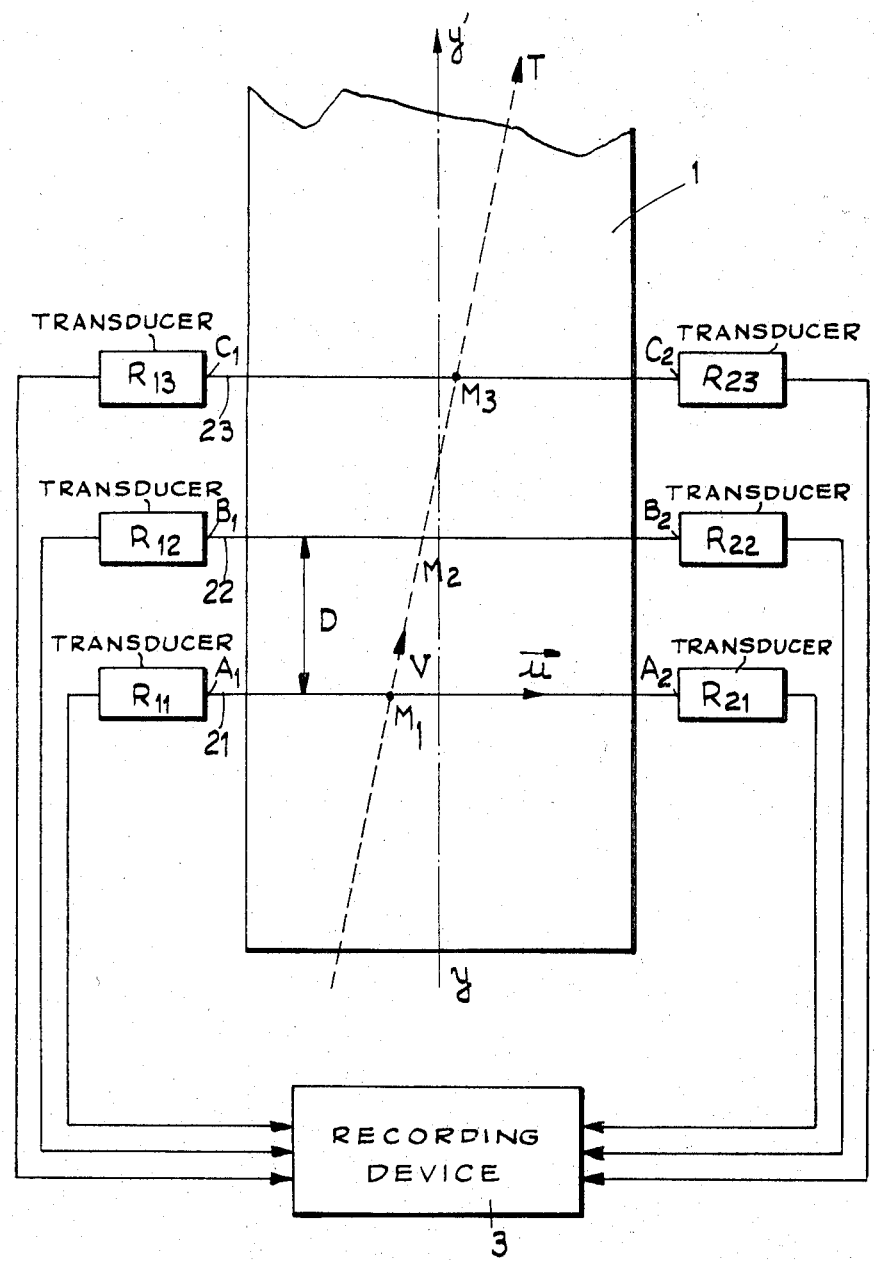

3,441,847
SYSTEM FOR MEASURING THE VECTOR COMPONENTS OF THE SPEED OF A BODY
Michel Hassid and Francois Garnier, Paris, France, assignors to Societe Pour l'Etude et la Realisation des Procedes Electroniques de Calcul "Analac," a corporation of France
Filed Nov. 26, 1965, Ser. No. 509,917
Claims priority, application France, Nov. 27, 1964, 996,536, Patent 1,423,961
Int. Cl. G01r 11/02; G01v 1/30; G01b 5/24
U.S. Cl. 324—70                                       4 Claims

ABSTRACT OF THE DISCLOSURE

A system for measuring the components of the speed vector of a body moving along a given path with respect to the longitudinal axis of the path, comprising at least two identical conduits arranged, perpendicular to the axis of said path. The conduits are filled with a fluid and at each end thereof is coupled a transducer, generating a signal upon the contact of said body with said conduits and means are provided for determining the instants of occurrence of said signal.

---

The present invention relates to systems for determining the position of a body moving on the ground with respect to a system of axes.

In some instances it may be of interest to determine the instantaneous position of an object moving over the ground, relative to an axis, as well as the components of its velocity relative to this axis and an axis perpendicular thereto. This problem is of special interest, when it is desired to measure the landing or take-off speed of an aircraft and the deviation of its direction from the axis of the runway.

It is an object of this invention to provide an arrangement for solving this problem.

According to the invention there is provided a system for measuring the components of the speed vector of a body moving along a given path with respect to the longitudinal axis of said path and with respect to an axis perpendicular to said path, comprising: at least two transmission lines arranged parallel to the perpendicular axis and equally spaced from each other and transducers connected to each end of said lines for generating a signal upon the contact of said body with said transmission lines and means for determining the instants of occurrence of said signals.

For a better understanding of the invention and to show how the same may be carried into effect reference will be made to the drawing accompanying the following description and the only figure which shows an arrangement according to the invention.

The figure shows very diagrammatically, a runway 1, for example, a landing runway with its longitudinal axis $y'y$.

Along this runway and perpendicularly to the axis $y'y$ are arranged parallel conduits 21, 22, 23, which are identical and have the same length, for example, rubber pipes, filled with a fluid, such as air or with a liquid, such as those used for counting motor vehicles on a road. The pipes are spaced at equal intervals D.

Each pipe terminates at its ends in respective transducers $R_{1i}$, $R_{2i}$, where $i = 1 \ldots n$.

The outputs of these transducers are connected to a measuring or recording device 3 of a known type for determining the instants at which signals are transmitted by the transducers and for deriving therefrom the components of the aircraft velocity, as explained hereinafter.

The system operates as follows:

A moving body M is assumed to follow a rectilinear trajectory T inclined on the axis $y'y$, with a speed V, assumed to be small compared with the speed $u$ with which a wave propagates in the pipes.

By passing over each pipe, the moving body causes a disturbance which propagates with the speed $u$ towards the two transducers $R_{2i}$ and $R_{1i}$. At its arrival at a transducer, an electric signal is generated.

Thus, $M_1$ to $M_n$ being the successive contact points of the moving object with the pipes, at the instant $t_1$ a first signal is generated by transducer $R_{11}$, at the instant $t'_1$ a second signal is generated by transducer $R_{21}$, at the instant $t_2$ a third signal is generated by transducer $R_{12}$, at the instant $t'_2$ a fourth signal is generated by transducer $R_{22}$.

Let $$\Delta t_{12} = t_2 - t_1$$

$$\Delta t'_{12} = t'_2 - t'_1$$

Let $t$ be the time required by the moving body for passing from $M_1$ to $M_2$, from $M_2$ to $M_3$, etc., and let $A_1$, $A_2$, $B_1$, $B_2$, $C_1$, $C_2$ designate the respective ends of the pipes 21, 22, 23, etc. i.e., the points where the transducers are located. One may write:

$$\Delta t = \left(t'_2 - \left(\frac{\overline{B_2M_2}}{u}\right)\right) - \left(t'_1 - \left(\frac{\overline{A_2M_1}}{u}\right)\right) = t'_2 - \left(\frac{\overline{B_1M_2}}{u}\right) - t_1\left(\frac{\overline{A_1M_1}}{u}\right) \quad (1)$$

Setting:

$$\Delta \overline{d} = \overline{B_2M_2} - \overline{A_2M_1} = -(\overline{B_1M_2} - \overline{A_1M_1})$$

equations including the components $V_x$ and $V_y$ of the velocity of the moving body along the axis $y'y$ and the axis $xx'$ perpendicular thereto, may be written:

$$D = V_y \Delta t$$

$$\Delta d = V_x \Delta t_1$$

substituting for $\Delta t$ its value from Equation 1:

$$D = V_y\left(\Delta t_{12} \frac{\Delta d}{u}\right) = V_y\left(\Delta t'_{12} \frac{\Delta d}{u}\right) \quad (2)$$

$$\Delta d = V_x\left(\Delta t_{12} \frac{\Delta d}{u}\right) = V_x\left(\Delta t'_{12} \frac{\Delta d}{u}\right) \quad (3)$$

From Equation 2 it follows that $$\Delta d = u \frac{\Delta t'_{12} - \Delta t_{12}}{2}$$

from which follow the following expressions for $V_y$ and $V_x$:

$$V_y = \frac{2D}{\Delta t_{12} + \Delta t'_{12}} = \frac{2D}{\Delta t_{23} + \Delta t'_{23}} = \cdots \quad (4)$$

and $$V_x = u \frac{\Delta t'_{12} - \Delta t_{12}}{\Delta t_{12} + \Delta t'_{12}} = u \frac{\Delta t'_{23} - \Delta t_{23}}{\Delta t_{23} + \Delta t'_{23}} = \cdots \quad (5)$$

It may be noted that in the expression for $V_y$, $u$ does not appear whilst $V_x$ depends on $u$, which could be readily foreseen; yet $u$ may be subject to fluctuations caused, for example, by the temperature of the fluid.

This drawback may be eliminated by operating on all the pipes at once or simply on three successive pipes.

Under the above made assumption that the speed V of the aircraft is low compared to $u$ (which is generally true since the landing speed of an aircraft does not exceed 100 m./s. while the propagation velocity $u$ of the sound in a liquid is of the order of 1500 m./s.), the invention makes it possible to know at any instant:

(a) The position of the aircraft along the runway, through knowledge of the instants at which signals are generated by the successive transducers:

(b) Its position relative to the axis of the runway, due to the relative values of $t_1$ and $t'_1$;

(c) The instantaneous components $V_x$ and $V_y$.

What is claimed is:

1. A system for measuring the vector components of the speed of a body moving along a given path with respect to the longitudinal axis of said path and with respect to an axis perpendicular to said path, comprising: at least two elongated transmission means spaced from each other and parallel to said perpendicular axis for propagating wave energy at a given velocity away from a point of contact with said body toward the ends of said transmission means, a plurality of transducers, each of said transducers connected to a respective end of said transmission means, each of said transducers receiving wave energy transmitted from the point of contact of said body with said transmission means for generating a signal at the instant of arrival of said energy at the respective end of said transmission means, and means connected to said transducers for determining said vector components of the speed of said body by analyzing the relative instants of occurrence of said signals.

2. A system according to claim 1, wherein said transmission means are pipes filled with a fluid, undergoing a disturbance upon the contact of said body therewith.

3. A system according to claim 2, wherein said transducers connected at each end of the pipes are electromagnetic transducers which generate electric signals when affected by said disturbance.

4. A system according to claim 1, wherein said means for determining said vector components comprise means for recording the arrival times of the successive signals generated by said transducers.

References Cited

UNITED STATES PATENTS

| | | | |
|---|---|---|---|
| 2,795,273 | 6/1957 | Putnam | 324—70 |
| 2,877,454 | 3/1959 | Zedlar | 324—70 |
| 3,317,164 | 5/1967 | Marcheron | 324—70 |
| 3,383,652 | 5/1968 | Charot | 324—70 |

RUDOLPH V. ROLINEC, *Primary Examiner.*

MICHAEL J. LYNCH, *Assistant Examiner.*

U.S. Cl. X.R.

33—1